United States Patent
Kadota (10) Patent No.: US 7,643,160 B2
(45) Date of Patent: Jan. 5, 2010

(54) SPOOL FILE MODIFYING DEVICE

(75) Inventor: Masatoshi Kadota, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 642 days.

(21) Appl. No.: 10/279,325

(22) Filed: Oct. 24, 2002

(65) Prior Publication Data

US 2003/0076519 A1    Apr. 24, 2003

(30) Foreign Application Priority Data

Oct. 24, 2001   (JP)   .............................. 2001-326411

(51) Int. Cl.
  *G06K 15/02*   (2006.01)
(52) U.S. Cl. .................. 358/1.11; 358/1.1; 358/1.9; 358/1.15; 358/1.18; 709/201; 709/217; 709/226; 709/244
(58) Field of Classification Search ................ 358/1.11, 358/1.15, 1.13, 1.16, 1.14; 707/102, 205, 707/203; 709/203, 226, 244; 715/255
See application file for complete search history.

(56) References Cited

U.S. PATENT DOCUMENTS

| 5,113,355 | A | * | 5/1992 | Nomura ...................... 358/1.11 |
| 5,993,088 | A | * | 11/1999 | Nogay et al. ................... 400/78 |
| 6,175,426 | B1 | * | 1/2001 | Hirooka ....................... 358/1.9 |
| 6,313,920 | B1 | * | 11/2001 | Dresevic et al. ............ 358/1.11 |
| 6,417,931 | B2 | * | 7/2002 | Mori et al. .................. 358/1.15 |
| 6,433,882 | B1 | | 8/2002 | Mori et al. |
| 6,765,689 | B1 | * | 7/2004 | Benstein ..................... 358/1.18 |
| 7,319,532 | B2 | * | 1/2008 | Oomura et al. ............. 358/1.11 |
| 2002/0101600 | A1 | * | 8/2002 | Sabbagh et al. ............ 358/1.13 |
| 2003/0038964 | A1 | * | 2/2003 | Ferlitsch ..................... 358/1.15 |
| 2003/0160991 | A1 | | 8/2003 | Kadota |

FOREIGN PATENT DOCUMENTS

| JP | 7121478 | 5/1995 |
| JP | 10011043 | 1/1998 |
| JP | 10-240476 | 9/1998 |
| JP | 11-184657 | 7/1999 |
| JP | 11-219265 | 8/1999 |
| JP | 11219265 | 8/1999 |
| JP | 2000-343772 A | 12/2000 |

* cited by examiner

*Primary Examiner*—King Y Poon
*Assistant Examiner*—Richard Z Zhu
(74) *Attorney, Agent, or Firm*—Day Pitney LLP (57) ABSTRACT

A spool file modifying device employed in a print server is connected with a printer. Further, the print server and at least one external terminal are interconnected. A spool file representing a print job that is instructed at the external terminal is converted into print data adaptable to the printer. The spool file modifying device includes a font data extracting system that extracts font data included in the spool file, a registering system that registers the extracted font data with the print server, and a modifying system that modifies the spool file to create a modified spool file in accordance with modifying information included in the spool file. The modified spool file is converted into the print data using the extracted font data, and then transmitted to the printer.

22 Claims, 6 Drawing Sheets

SPOOL FILE MODIFYING DEVICE

BACKGROUND OF THE INVENTION

The present invention relates to a spool file modifying device which is used to modify a spool file for printing to create a new spool file, and more particularly to a spool file modifying device provided in a print server that receives a spool file created by an external apparatus, and modifies the received spool file to create a modified spool file for a modified print job.

Conventionally, a network printing system has been known and widely employed. An exemplary network system typically includes a plurality of personal computers (hereinafter occasionally referred to as PCs) interconnected through a network, and a printer connected to one of the interconnected PCs. The printer functions as a shared printer which can be used by any PC connected with the network.

Figure 7:
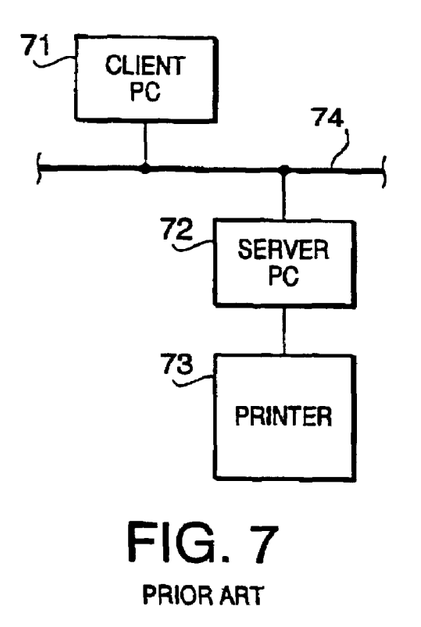
FIG. 7 shows a client PC and a server PC interconnected through a network, and a printer connected to a server PC.

FIG. 7 shows an exemplary configuration of the conventional network printing system 700. The network printing system 700 includes a server PC 72 to which a printer 73 is connected, and a client PC 71. The server PC 73 and the client PC 71 is connected through a network 74. It should be noted that, although only one client PC 71 is shown in FIG. 7, a plurality of client PC having the similar configuration as the client PC 71 shown in FIG. 7 are interconnected through the network 74.

The server PC 72 is capable of outputting print data to the printer 73 to have the printer 73 perform print jobs. Further, any one of the client PCs 71 on the network 74 is capable of having the printer 73 perform print jobs through the network 74 and the print server PC 72. That is, the printer 73 is used as a shared printer for the network printing system 700.

Figure 8:
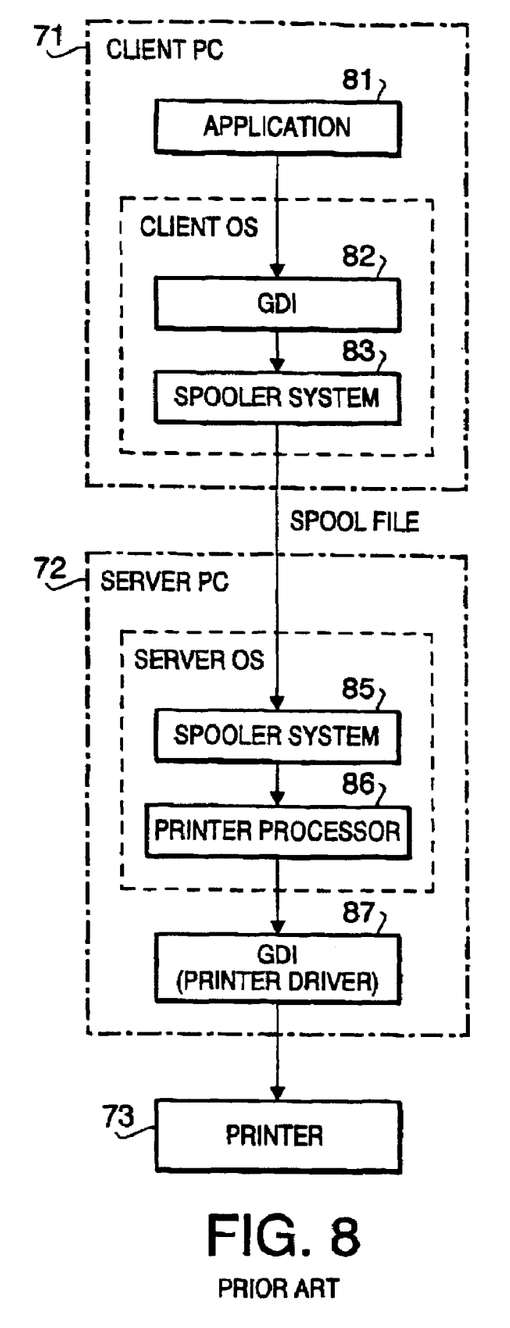
FIG. 8 is a chart showing a data flow in a conventional network printing system.

FIG. 8 illustrates data flow of the printing system 700 when the client PC 71 outputs a print request to the printer 73. For the describing purpose, it is assumed that each of the client PC 71 and the server PC 72 employs "Windows 95" (trademark), which is provided by Microsoft Corporation, as its operating system.

When the client PC 71 is operated by a user, and a request for a print job is output by an application 81 running on the client PC 71, the request (print request) is transmitted to a GDI (Graphic Device Interface) 82, which is a program module provided by the client OS, through a printer driver of the client OS.

The GDI 82 generates a DC (Device Context) which is a virtual display area or a virtual device. The DC is provided for the use of the application 81. When the DC is provided, the application 81 performs an imaging procedure to write an image in the DC at coordinates thereof, thereby an EMF (Enhanced Meta File), which is an intermediate file independent of kind of a printer, is created for each printing page.

A plurality of intermediate files for respective pages are combined into a spool file, which corresponds to one print job. The thus created spool file is transmitted to the server PC 72 through the network 74. In the server PC 72, a spooler system 85, which is a part of function of the server OS, receives the spool file and temporarily stores (i.e., spools) the received spool file in a storage device. Then, a print processor 86 retrieves the spool file stored in the storage device, and transmits the same to the GDI (printer driver) 87, which converts the received spool file into data having printer control codes suitable to the target printer 73 connected to the server PC 72, and transmits the converted data for printing.

When the spool file including the EMFs (Enhanced Meta Files) is transmitted from the client PC 71 to the server PC 72, font data which is used for performing the print job created by the client PC 71 will not generally be transmitted to the server PC 72. That is, only information identifying the font to be used in the print job is transmitted. Thus, the server PC 72 generally converts the spool file into the printer control codes, using the font data pre-installed in the server PC 72.

With the above configuration, as far as the server PC 72 includes the font data identified by the font information included in the spool file transmitted from the client PC 71, the print job created by the client PC 71 is correctly performed by the printer 73. However, if the font data used for creating the print job in the client PC 71 is not provided in the server PC 72, the print job is not performed correctly.

Recently, operating systems have been improved, and an operating system that transmits a spool file with the font data attached has been developed. An typical example of such an OS is "Windows 2000" (trademark of Microsoft Corporation).

If the client OS and the server OS in FIG. 8 are "window 2000", and if the font data to be used for the print job created by the client PC 71 is not installed in the server PC 72, the font data is attached to the spool file (specifically, the font data is attached to the EMF of each page) when transmitted from the client PC 71 to the server PC 72. In such a system, therefore, when print Jobs are created in the client PC 71 using applications 81, it is unnecessary to mind whether the font data is installed in the server PC 72, and the print job is always performed as desired (i.e., the font data used in the client PC 71 is used for printing even if the server PC 72 does not have the font).

In the meantime, recently, there is a need for performing modified printing jobs. The modified print jobs include, for example, a printing in a multi-page format with which a document is printed such that a plurality of pages are reduced and incorporated within one page of printed document. Another requirement is that two different images are printed overlaid (e.g., printing of watermark). Further, an order of a plurality of pages to be printed is sometimes required to be changed.

The modified print job is typically created by the application 81. However, it can also be done by modifying a spool file which has been output by the application 81 to perform an ordinary print job. An example of a device that processes the spool file to modify the print job is disclosed in Japanese Patent Provisional Publication No. HEI 11-219265.

In the case shown in FIG. 8, for example, when the modified print job is to be performed, a spool file stored by the spooler system 85 is retrieved via the print processor 86. Next, the retrieved spool file is divided into intermediate files for respective printing pages. Then, the page-divided intermediate files are processed (modified) to create a new spool file, or a modified spool file, which is returned to the spooler system 85. Then, the GDI 87 converts the modified spool file into print data suitable to the printer 73.

Depending on the OS, however, when an original spool file is processed to create a modified spool file as described above, the font data incorporated in the original spool file cannot be used when the modified spool file is converted into the printer control codes (i.e., print data) by the GDI 87.

A typical example of such an OS is "Windows 2000". As mentioned above, when both the client OS and the server OS are "Windows 2000", and a spool file output by the client PC 71 is used as it is in the server PC 72 for printing, even if font data which is not installed in the server PC 72 is used in the client PC 71 when the print job is created, the font data is incorporated in the spool file transmitted from the client PC 71 to the server PC 72, and a desired print result is obtained using the transmitted font data.

However, if the spool file transmitted to the server PC 72 is processed to create another spool file for creating a modified print job, the font data included in the original spool file is no more usable. Therefore, since the server PC 72 does not have the font data, the print job should be performed without using the desired font data, which results in an undesired print result.

SUMMARY OF THE INVENTION

The present invention is advantageous in that an improved spool file modifying device is provided, with which it becomes possible to use font data included in an original spool file transmitted from an external device when the original spool file is processed and another spool file is created to perform a modified print job.

According to an aspect of the invention, there is provided a spool file modifying device employed in a print server which is connected with a printer. The print server is connected an external terminal. The print server converts a spool file representing a print job instructed at the external terminal into print data adaptable to the printer. The spool file modifying device is further provided with a font data extracting system that extracts font data included in the spool file, a registering system that registers the extracted font data with the print server, and a modifying system that modifies the spool file to create a modified spool file according to modifying information included in the spool file. The print server converts the modified spool file into the print data using the extracted font data registered by the registering system and transmits the print data to the printer.

With the above configuration, since the font data is extracted and registered as the system font, the modified print job is correctly performed using the extracted font. That is, even if the font data included in the spool file cannot be used, the print job is completed as desired.

Optionally, there is provided a registration deleting system that deletes the extracted font from the registration when the print server has completed transmission of the print data to the printer. With this configuration, the font data extracted from the spool data is used only for performing the corresponding print job, and will not be used for other purposes.

Specifically, the extracted font data is stored in a memory, and the registration deleting system deletes the extracted font data stored in the memory when the print server has completed transmission of the print data to the printer.

Optionally, the memory is a volatile memory. With this configuration, even though the font data is not completely deleted when the print server has completed transmission of the print data to the printer, when the print server is shut down, the data is completely deleted.

Further optionally, the spool file modifying device may include a font data detecting system that examines the spool file to detect whether font data is included in the spool file. In this case, the font data extracting system and the registering system may be configured to function when the font data detecting system detects that font data is included in the spool file.

For example, the modified print job may include overlap printing, manual duplex printing, page-exchange printing or multi-page printing.

Further optionally, the spool file modifying device may be provided with a storage that stores the spool file. The spool file stored in said storage is replaced with the modified spool file.

In a particular case, the print server and the external device may be interconnected with each other through a network system.

In a particular case, the spool file is created in the external terminal, and is transmitted to the print server. Alternatively, the spool file may not be created in the external terminal, but is created in the server as instructed by the external terminal.

According to another aspect of the invention, there is provided a spool file modifying device employed in a print server which is connected with a printer, to which at least one external terminal is also connected. The print server converts a spool file representing a print job instructed at the external terminal to print data adaptable to the printer. The spool file modifying device is provided with a spool file storage that stores the spool file, a retrieving system that retrieves the spool file stored in the spool file storage, a font data detecting system that examines the spool file retrieved by the retrieving system to detect whether font data is included in the spool file, a font data extracting system that extracts the font data included in the spool file when the font data detecting system detects that the font data is included in the spool file, a registering system that registers the extracted font data with the print server, and a modifying system that modifies the spool file in accordance with modifying information included in the spool file. The spool file stored in the spool file storage is replaced with the modified spool file. The print server converts the modified spool file into the print data using the extracted font data registered by the registering system, and transmits the print data to the printer.

Optionally, the spool file modifying device may further include a registration deleting system that delete the extracted font data from the registration when the print server completed transmission of the print data to the printer.

The spool file modifying device may further include a volatile memory, and the registering system stores the font data in the volatile memory as a system font of the server.

Optionally, the spool file modifying device may include a dividing system that divides the spool file stored in the spool file storage into intermediate files for respective pages. The font data detecting system may examine each of the intermediate files divided by the dividing system to detect whether font data is included therein, and the font data extracting system may extract the font data from each of the intermediate files when it is detected to include the font data.

Optionally, the font data detecting system may examine the intermediate files sequentially from a first page to the end.

In a particular case, the print server and the external device are interconnected with each other through a network system.

In a particular case, the spool file is created in the external terminal, and is transmitted to the print server. Alternatively, the spool file may not be created in the external terminal, but is created in the server as instructed by the external terminal.

According to another aspect of the invention, there is provided a method of modifying a spool file in a print server, which is connected with a printer. The print server is connected with at least one external terminal. The print server converts a spool file representing a print job instructed at the external terminal into print data adaptable to the printer. According to the method, the spool file is examined to detect whether font data is included in the spool file. Then the font data included in the spool file is extracted if the font data is included in the spool file. When the font data is extracted, it is registered with the print server. Thereafter, the spool file is modified to create a modified spool file according to modifying information included in the spool file. The spool file is replaced with the modified spool file. After modification, the modified spool file is converted into print data using the extracted font data, and then transmitted to the printer.

Optionally, the method may further include deleting the extracted font from the registration upon completion of transmission of the print data to the printer.

Further optionally, the method may further include dividing the spool file into intermediate files for respective pages. It should be noted that the examining the spool file may examine each of the intermediate files as divided to detect whether font data is included therein, and the extracting the font data may extract the font data from each of the intermediate files when it is detected to include the font data.

Still optionally, the intermediate files may further be examined sequentially from a first page to the end.

In a particular case, the print server and the external device are interconnected through a network system.

In a particular case, the spool file is created in the external terminal, and is transmitted to the print server. Alternatively, the spool file may not be created in the external terminal, but is created in the server as instructed by the external terminal.

The device and method according to the present invention can be realized when appropriate programs provided and executed by a personal computer or the like. Such programs may be stored in recording medium such as a flexible disk, CD-ROM, memory cards and the like and distributed. Alternatively or optionally, such programs can be distributed through networks such as the Internet.

For example, according to a further aspect of the invention, there is provided a computer-accessible memory medium. The memory medium contains a program to be executed by a computer to realize a spool file modifying device for a print server, which is connected with a printer. The print server is connected with an external terminal, and converts a spool file representing a print job instructed at the external terminal into print data adaptable to the printer. The program contained in the memory medium realizes a method, with which, font data included in the transmitted spool file is extracted, the extracted font data is registered with the print server, the spool file is modified, according to modifying information included in the spool file, to create a modified spool file. The modified spool file is then converted into the print data, by the print server, using the extracted font data as registered, and is transmitted to the printer.

DESCRIPTION OF THE EMBODIMENT

Hereinafter, a network printing system according to an embodiment of the invention will be described with reference to the accompanying drawings.

Figure 1:
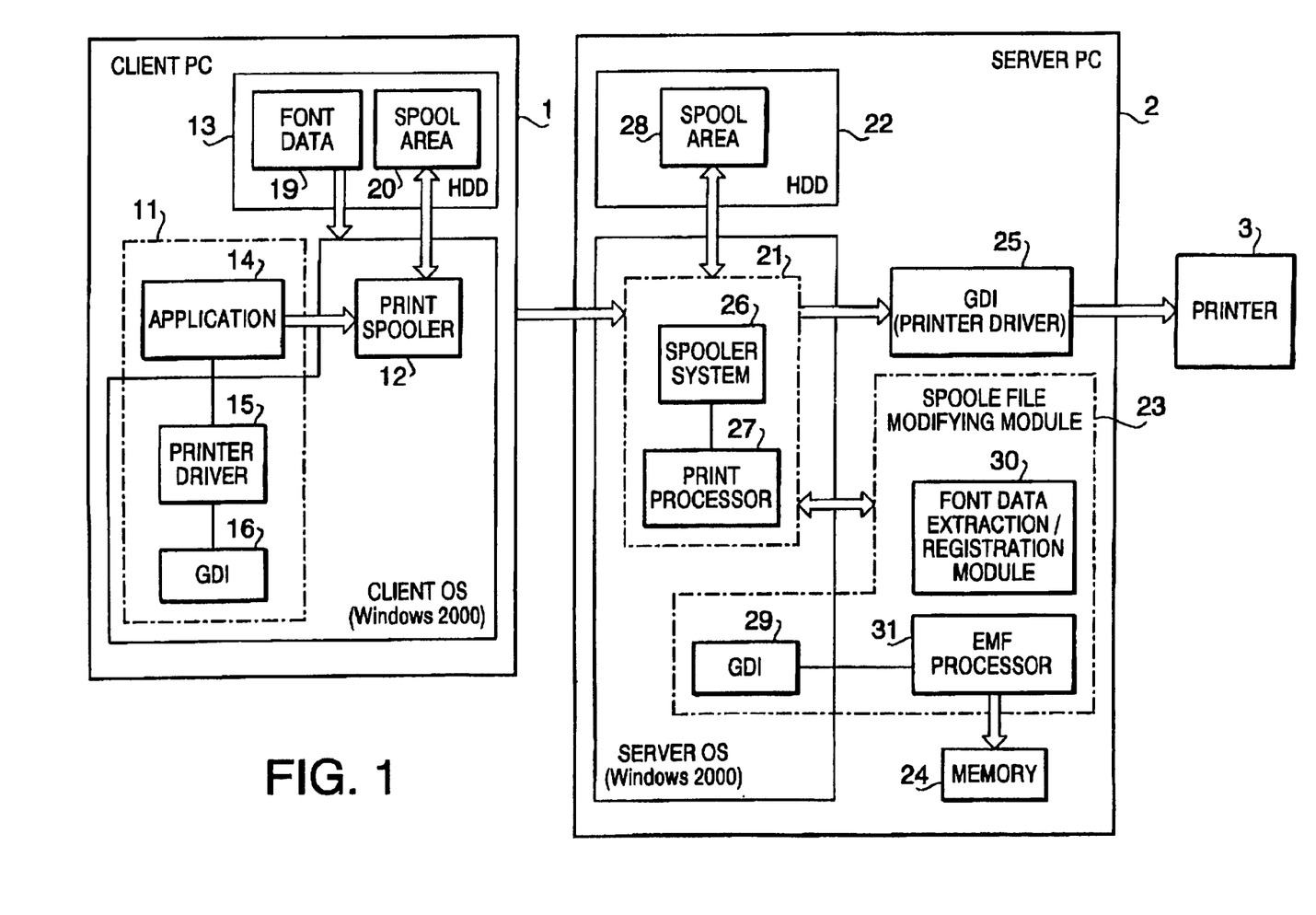
FIG. 1 is a block diagram showing a configuration of a network printing system according to an embodiment of the invention.

FIG. 1 is a block diagram showing a configuration of a network printing system according to an embodiment of the invention. The network printing system according to the embodiment includes, similarly to the conventional system shown in FIG. 7, a plurality of client PCs 1 and a server PC 2 interconnected through a network, and a printer 3 is connected to the server PC. For the sake of simplicity, only one client PC 1 is shown in FIG. 1. Further, although only one server PC 2 is shown in FIG. 1, a plurality of server PC 2 may be provided in the network printing system.

The server PC 2 is capable of outputting print data directly to the printer 3. Each client PC 1 connected to the network is also capable of having the printer 3 perform print jobs through the server PC 2. In the embodiment, an operating system of the client PC 1 (hereinafter occasionally referred to as a client OS) and an operating system of a server PC 2 (hereinafter occasionally referred to as a server OS) are "Windows 2000".

An intermediate file generating module 11 of the client PC 1 generates intermediate files for printing, which are transmitted from a print spooler 12 to the server PC 2 as a spool file for each print job. In the server PC 2, the received spool file is temporarily stored in a spool area 28 by a print spooler 21. Further, if the spool file includes modification information representative of a modified print job, the spool file is processed in a spool file modifying module 23. The modified spool file is returned to the spool area 28 (i.e. the modified spool file replaces the originally received spool file that is stored in the spool area 28). In accordance with an operation status of the printer 3, the spool file stored in the spool area 28 is converted into printer control codes by a GDI 25. Then, the printer control codes (i.e., print data) are transmitted from the server PC 2 to the printer 3, thereby the modified print job is performed.

It should be noted that, each of the client PC 1 and the server PC 2 includes hardware such as a CPU, ROM, RAM, I/O unit and the like, which operate under control of the OS. Application software such as application programs and device drivers run under control of the OS. In particular, in the server PC 2, the print spooler 21 and the GDI 29 are provided as program modules which bear part of functions of the server OS. Further, font data extraction/registration module 30, an EMF processor 31 and a GDI 25 are device drivers (programs) implemented in the server PC 2 for controlling the printer 3 in association with the server OS.

A print processor 27 is a program module which is installed in the server PC 2 corresponding to the printer 3 in addition to a print processor (not shown) originally implemented in the OS. The print processor 27 functions, in association with the spool file processor 23 and a memory 24, to constitute a spool file processing device.

According to the embodiment, all the programs realizing various functions of the server PC 2 are stored in a hard disk drive (HDD) 22. The memory 24 is a volatile memory such as a RAM.

Next, operation of the network printing system when the client PC 1 outputs a print request will be described.

As shown in FIG. 1, print data created by an application 14 running on the client PC 1 is transmitted to a GDI 16, which is a program module supplied by "Windows 2000" via the printer driver 15 of "windows 2000". The GDI 16 generates a DC (device context) which is a virtual display area or a virtual device. At designated coordinates of the DC, print data which is independent of types of devices (printer, display and the like) is stored for each print job (i.e., images are drawn in the virtual device). The application 14 is application programs such as a word processor, tabular program, and the like, which run on the client OS.

Generally, there are two types of GDI: one for managing the DC and/or creating EMFs (Enhanced Meta Files); and the other for converting the data stored in the DC to commands depending on a certain device (i.e., a target device) such as a printer or a display. The former is provided by the OS, and examples of the same are the GDI 16 and a GDI 29 (which will be described later). The latter is supplied from a manufacturer of a device as a device driver, example of which is a GDI 25 (which will be described later).

As described above, by drawing images on the DC, or the virtual device, EMFs (intermediate files) which are independent of the type of device are generated for each page. The EMFs are combined by the print spooler 12 and a spool file for each print job is created. In the present embodiment, before the EMFs are combined by the print spooler 12, the client PC 1 communicates with the server PC 2 to check whether the font used in each print job is installed in the server PC 2.

If the server PC 2 is not installed with the font to be used, necessary font data among font data 19 stored in the HDD 13 is retrieved and incorporated in the spool file. Further, if a user instructs a modified printing with respect to the print data created by the application 14, a modification information (which is information indicative of the modification of the spool file) is also attached to the spool file.

The spool files for respective print jobs are stored in the spool area 20 provided in the HDD 13, and are transmitted to the server PC 2 using an RPC (Remote Procedure Call). Incorporation of the font data in the spool file will be described in detail later.

When the spool file is transmitted from the client PC 1 to the server PC 2, the print spooler 21 of the server PC 2 receives the transmitted spool file, and the spooler system 26 temporarily stores the received spool file in a spool area 28 provided in a HDD 22.

When the modified printing such as the multi-page printing and/or overlap printing is performed, the spool file processing module 23 is executed, thereby spool files for respective print jobs, which are stored in the spool area 28, are modified for the modified printing. Specifically, the print processor 27 retrieves a spool file stored in the spool area 28, and judges wither the retrieved spool file includes the modification information. If the modification information is included, the retrieved spool file is transferred to the spool file modifying module 23.

The modification performed by the spool file modifying module 23 will be described schematically.

Firstly, the spool file transferred from the print processor 27 is divided into EMFs (intermediate files) for respective pages. Then, a copy of the EMF for each page is stored as a temporary file in the memory 24 or the like. The temporary file will be deleted when it becomes unnecessary. It should be noted that, before the spool file is divided into EMFs, the modification information is obtained and modification to be performed is identified. The modification performed by the spool file modifying module 23 will be described in detail later.

Figure 2:
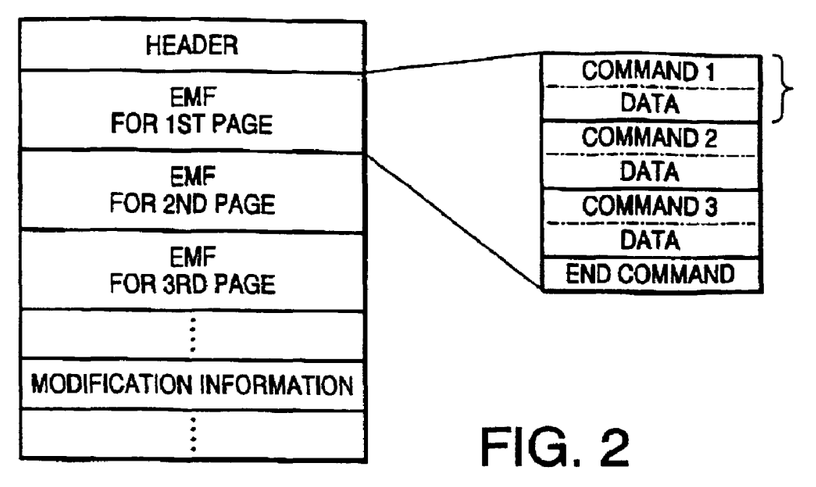
FIG. 2 schematically shows a structure of a spool file.

FIG. 2 shows a structure of the spool file. The spool file includes a header, followed by EMFs for respective pages and modification information. The EMF of each page includes a plurality of records including a plurality of sets of a command and data, followed by an end command. The font data is included in some record. Hereinafter, the record including the font data will be referred to as enhanced record. It should be noted that, strictly speaking, there are enhanced records which do not include the font data, which will be described later.

It should be noted that the "enhanced record" is an enhanced record of an original record of an EMF. Therefore, the enhanced record cannot be processed by a drawing routine of the EMF. In other words, the enhanced record is ignored if it is processed as a normal EMF record.

The font data extraction/registration module 30 judges whether each EMF include font data. If the font data is included, the font data extraction/registration module 30 extracts the font data and registers the font data as a system font of the server OS. Thereafter, the EMF processing module 31 processes each EMF (for each page) in accordance with the modification information to create a new EMF. The new EMF is returned to the spool area 28 by the spooler system 26. The EMF returned to the spool area 28 and corresponding to a new print job is transferred to the GDI 25 by the print processor 27. Then, the GDI 25 converts the transferred EMF, which corresponds to the new print job, into printer control codes suitable to the printer 3, and transmits the printer control code to the printer 3. The printer control code transmitted to the printer 3 is the print data having suitable format for the printer 3.

It should be noted that different manufactures generally have different specifications of the printer control commands. That is, various command sets defined by PDL (Page-Description Language) are known, examples of which are "PCL (Printer Control Language)" of Hewlett Packard, and "Postscript" of Adobe. The GDI 25 converts the spool file consisting of EMFs for respective pages into the printer control codes in accordance with the PDL employed in the printer 3.

Figure 3:
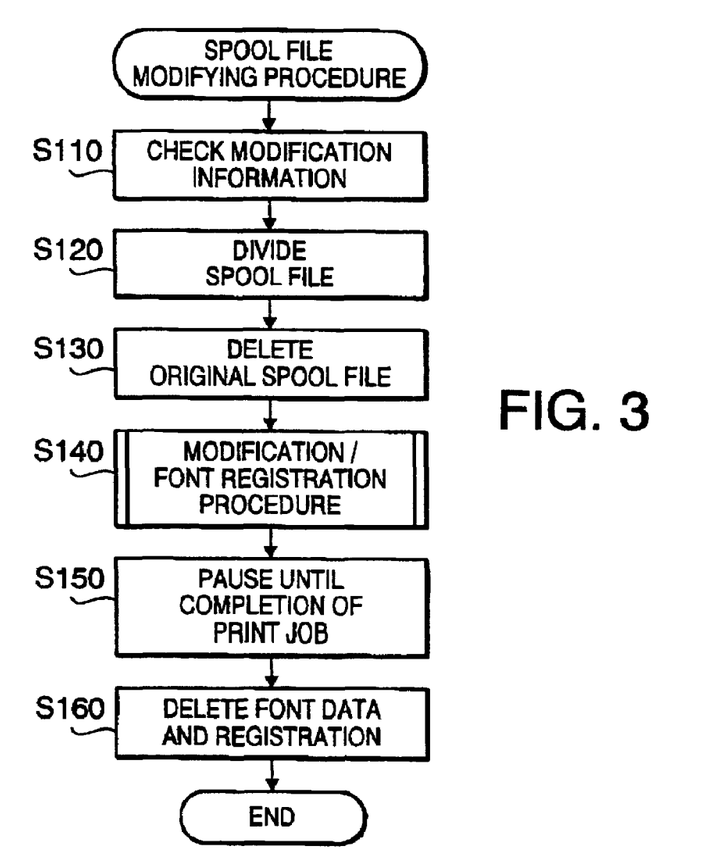
FIG. 3 is a flowchart illustrating a SPOOL FILE MODIFYING PROCEDURE according to an embodiment of the invention.

In the network printing system described above, when the print processor 27 judges that the spool file includes the processing information, and the spool file is transferred to the spool file processing module 23, a spool file modifying procedure is executed. FIG. 3 is a flowchart of a SPOOL FILE MODIFYING PROCEDURE, which is provided as a program module and executed by the server PC 2.

When the SPOOL FILE MODIFYING PROCEDURE is initiated, in S10, the modification information included in the spool file is checked, and how to edit the spool file is determined. In S120, the spool file is divided into EMFs for respective pages. In S130, an original print job (i.e., the spool file) stored in the spool area 28 is deleted, and control proceeds to S140.

In S140, in accordance with the modification information checked in S110, the page-divided EMFs are processed (modified). If each of the EMFs includes font data, it is extracted therefrom and registered as the system font (i.e., stored in the memory 24). After the spool file is modified, control pauses until all the pages are printed (S150). After the printing is finished, the font data stored in the memory 24, which is registered as the system font, is deleted, and the registration of the font data is also deleted.

If the font data which is transmitted from the client PC 1 in association with the spool data is remained in the server PC 2 as the system font after the spool file is printed, depending on the used font data, a copyright-law related problem may arise. Therefore, in S160, the font data which was incorporated in the spool file is deleted. With the above-described configuration, when the spool file including font data is transferred from the client PC 1 to the server PC 2, the font data is used only when the spool file is printed.

Further, according to the embodiment, the font data extracted from the spool file is not stored in the HDD 22, but in the volatile memory 24. Therefore, even through the font data is not deleted from the memory 24 for some reason after the process in S160 is finished, when the server PC 2 is shut out, the font data is completely deleted without fail.

Next, the MODIFICATION/FONT REGISTRATION PROCEDURE executed in S140 will be described in detail. In S140, as conventionally done, a procedure in accordance with the modification information included in the spool file is performed. The modification information may include execution of multi-page printing (i.e., printing with a plurality of successive pages incorporated in one page), overlap printing (i.e., printing with semitransparent characters overlaid on another image, which is also know as watermark printing), page-exchange printing (i.e., printing with pages exchanged), and the like.

Figure 4:
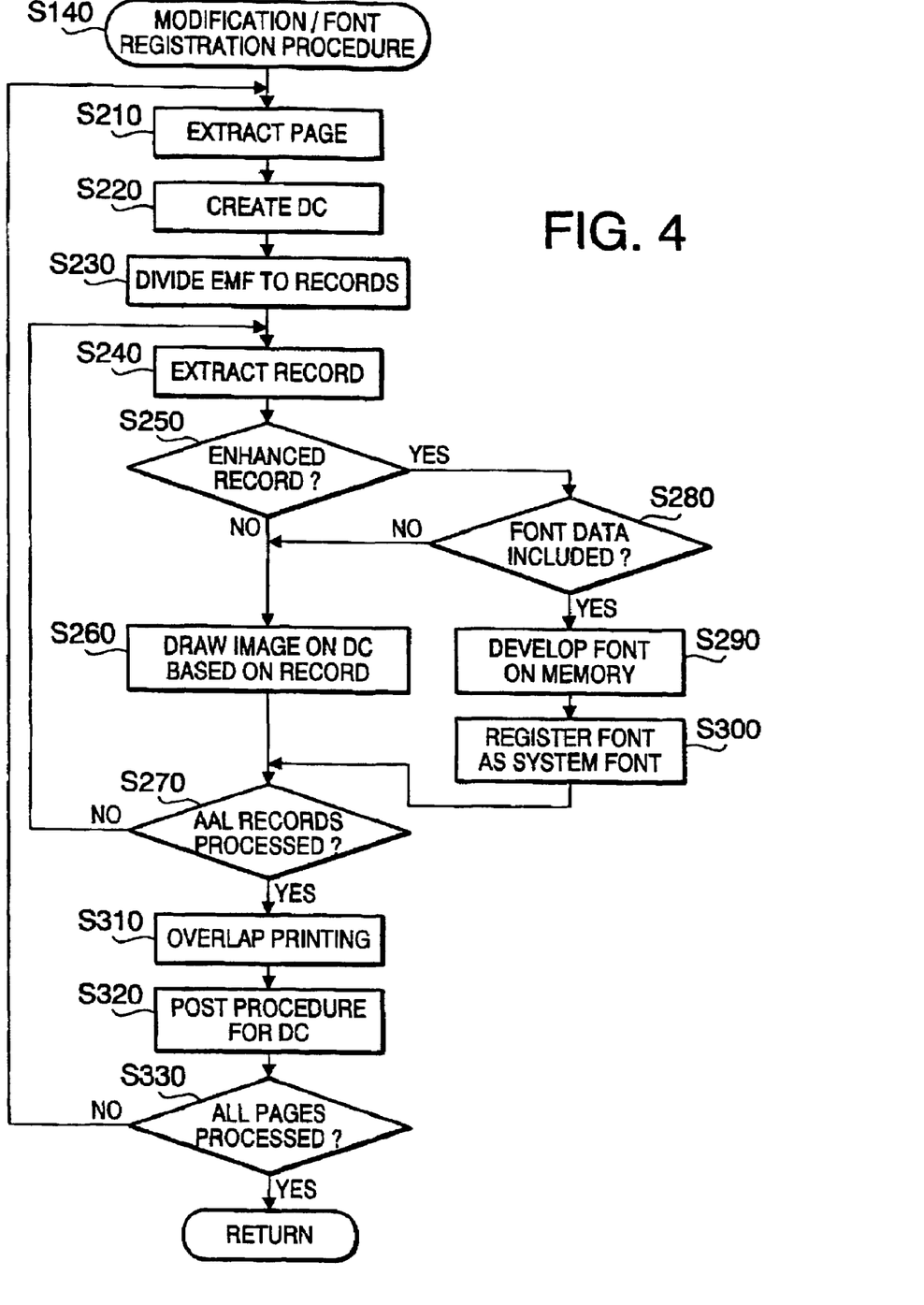
FIG. 4 is a flowchart illustrating an exemplary MODIFICATION/FONT REGISTRATION PROCEDURE which is called in the spool file modifying procedure shown in FIG. 3.

Taking the overlap printing as an example, the MODIFICATION/FONT REGISTRATION PROCEDURE will be described. FIG. 4 is a flowchart illustrating the modification/font registration procedure when the modification information indicates the overlap printing.

When the procedure shown in FIG. 4 starts, in S210, EMFs divided into pages are extracted sequentially from the first page to the end. That is, when a process in S210 is executed first time, the EMF of the first page is extracted. In S220, the GDI 29 which is a function of the OS is called and a DC is generated. In S230, the EMF for one page, which is extracted in S210, is divided into records (cf. FIG. 2). Then, in S240, the divided records are extracted. It should be noted that the extraction of the divided records is performed for one record at a time. That is, the steps S240-S270 are repeated for each record.

In S250, it is judged whether the extracted record is an enhanced record. If the extracted record is not the enhanced record (S250: NO), control proceeds to S260, and a drawing operation on the DC is executed in accordance with the contents of the record. If the extracted record is the enhanced record (S250: YES), control proceeds to S280, in which it is judged whether the record includes font data. As aforementioned, the record including the font data is handled as an enhanced record. However, there are records which do not include font data but are treated as enhanced records. Therefore, it is necessary to judge whether the record includes the font data in S280.

If the enhanced record does not include the font data (S280: NO), control proceeds to S260. If the enhanced record includes the font data (S280: YES), control proceeds to S290. In S290, the font data included in the enhance record is stored (i.e., developed) in the memory 24. Then, in S300, the font data stored in the memory 24 is registered as a system font. As a result of the procedure above, the font data which is included in the spool file and transmitted from the client PC 1 can be used as well as the font data originally provided in the server OS 2.

After the registration in S300, or after the procedure in S260, control proceeds to S270 where it is Judged whether the above procedure has been performed for all the records. If unprocessed records remain (S270: NO), control returns to S240. When all the records have been processed (S270: YES), the drawing operation on the DC based on the data for one page of EMF has been finished.

In S310, the overlap printing is performed. This process is for overlaying the semitransparent character train on another image developed on the DC.

After the overlap printing is completed, control proceeds to S320, and a post-process for the DC is executed. That is, the DC is closed and a command indicative of completion of process for one page of data has been finished is transmitted to the spooler system 26. With this process, the processed page of EMF is stored in the spool area 28 as a replacement of the unprocessed page of EMF. The newly stored EMFs are transmitted to the printer 3 depending on the operation status of the printer 3. Thus, even though the EMFs for all the pages have not been processed, a print job is performed from the pages for which the EMFs have been processed (modified).

In S330, it is judged whether the EMFs for all the pages have been modified. If all the EMFs have been processed (S330: YES), the procedure shown in FIG. 4 is terminated, and the procedure in S150 and the following steps will be performed. If there are unprocessed EMFs remained, control returns to S210, and the above-described procedure is repeated.

Figure 5:
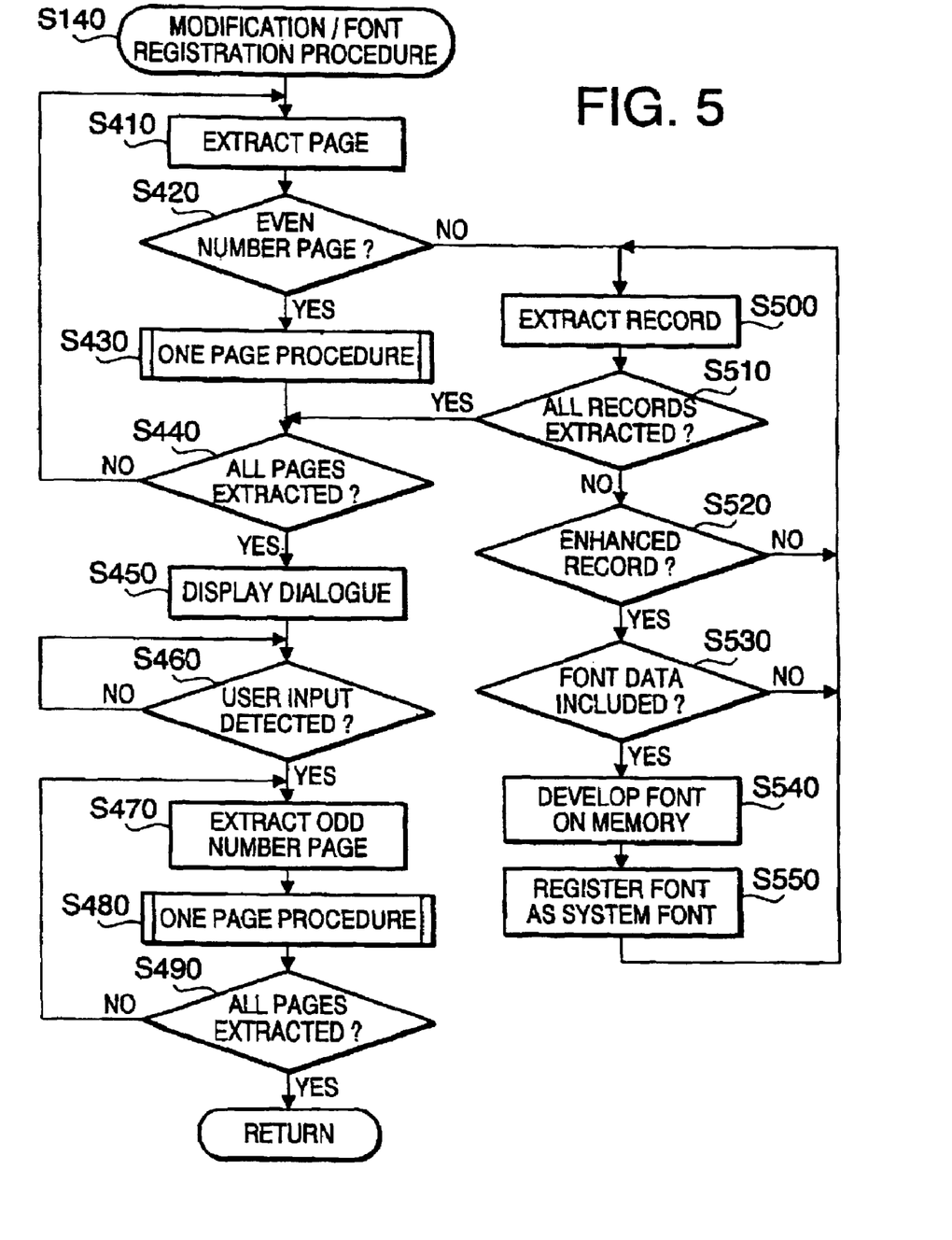
FIG. 5 is a flowchart illustrating another exemplary MODIFICATION/FONT REGISTRATION PROCEDURE which is called in the spool file modifying procedure shown in FIG. 3.

Next, a case where the modification information included in the spool file indicates a manual duplex printing (printing on both sides of a sheet so that the pages are aligned as a book), which is a kind of the page exchanging printing, will be described. FIG. 5 is a flowchart illustrating the MODIFICATION/FONT REGISTRATION PROCEDURE when the modification information indicates the manual duplex printing.

When the procedure in FIG. 5 starts, in S410, the EMFs for respective pages are extracted sequentially from the first page to the end, as in S210 of FIG. 4. In S420, it is judged whether the extracted page number is even. If the page number is even, control proceeds to S430, and if the page number is odd, control proceeds to S500. In this embodiment, the EMFs are extracted from the first page, when the process in S500 is executed at the first time, control proceeds to S500.

In S500, as in S240 of FIG. 4, the EMF for one page is divided into records. In S510, it is judged whether all the records have been extracted. It should be noted that the procedure of S520-S550 is performed for all the records until it is judged that all the records have been extracted in S510. If it is judged that all the records have been extracted and there is no record newly extracted in S500 (S510: YES), control proceeds to S440.

In S520, it is judged whether the extracted record is an enhanced record. If the extracted record is not the enhanced record (S520: No), control returns to S500. If the extracted record is the enhanced record (S520: YES), control proceeds to S530, where it is judged that the enhanced record includes font data. If the font data is not included in the enhanced record (S530: NO), control returns to S500. If the enhance record includes the font data (S530: YES), control proceeds to S540, where the font data is extracted and stored in the memory 24. Then, in S550, the font data stored in the memory 24 is registered as the system font. Then, control returns to S500.

At every extraction of record in S500, the procedures of S520 and the following steps are performed. After all the records have been extracted, when S500 is executed, no record is extracted. In such a case, it is judged that all the records have been extracted (S510: YES), and control proceeds to S440.

In S440, as in S330 of FIG. 4, it is judged that the EMFs for all the pages have been processed. If all the EMFs have been processed (S440: YES), control proceeds to S450. If not (S440: NO), control returns to S410, and the similar procedure is performed for remaining pages, page by page, sequentially. Therefore, The EMF for the first page is processed in S500-S550, and the EMF for the next page will be processed in S430 onwards.

Figure 6:
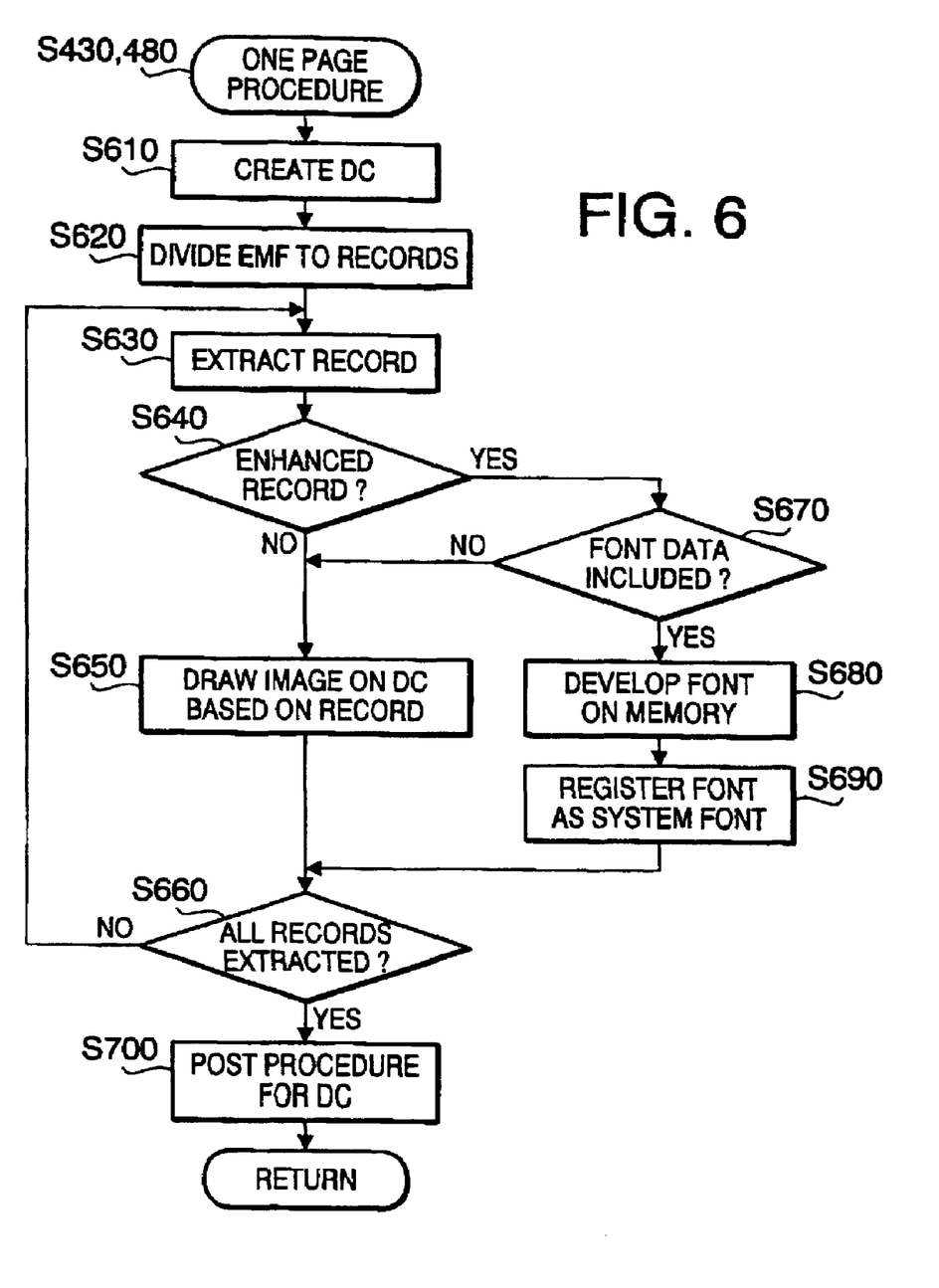
FIG. 6 is a flowchart illustrating a one page procedure called in the modification/font registration procedure shown in FIG. 5.

FIG. 6 shows a ONE PAGE PROCEDURE which is called in S430 and S480 of the MODIFICATION/FONT REGISTRATION PROCEDURE shown in FIG. 5.

It should be noted that a procedure in S610-S690 is similar to that in S220-S300 shown in FIG. 4, and a procedure in S700 is similar to S320 of FIG. 4. Therefore, the procedure in FIG. 6 will not be described in detail.

In summary, in the one page procedure, a DC is generated (S610), and then, the EMF extracted in S410 (or in S470) is divided into records (S620). For each record, it is judged whether the record is an enhanced record (S640), and if the record is the enhanced record, it is judged whether the enhanced record is included (S670).

If the font data is not included in the enhanced record (S670: NO), control proceeds to S650 where the data is drawn in the DC. If the enhanced record includes the font data (S670: YES), control proceeds to S680, where the font data is extracted and stored in the memory 24, and the font is registered as the system font (S690).

The procedure of S630-S690 is executed for all the records, and then the post treatment of DC is executed (S700). Thereafter, control returns to a procedure at which the one page procedure was called.

It should be noted that, when the one page procedure is completed, the EMF for the page is stored in the spool area 28 as a new EMF replacing the original EMF. The newly stored EMFs will be transmitted to the printer 3 depending on the operation status of the printer 3. Because of the above procedure, when the manual duplex printing is performed, the even number pages will be printed first.

In S440 (FIG. 5), it is judged whether the one page procedure (S430) or the procedure of S500 onwards has been finished for all the pages. If all the pages have not been processed (S440: NO), control proceeds to S410, and the EMF for the following page is processed. If all the pages of EMFs have been processed (S440: YES), control proceeds to S450.

In S450, a dialogue is displayed to indicate, for a user, to wait for completion of printing of even number pages, and to turn over the printed sheets and set the same on a sheet feeder.

The user waits for the completion of the printing of the even number pages. Upon completion, the user turns over the printed sheets and put the same on the sheet feeder in accordance with the dialogue message. Then, the user operates a key or the like (of, for example, the client PC 1). With this operation of the key or the like by the user, it is judged, in S460, that the user operation is input, and control proceeds to S470.

In S470, the odd number pages of EMFs are extracted sequentially, from the first page. Then, with respect to the extracted EMFs, the one page procedure is performed in S480. In S490, it is judged whether the one page procedure has been completed for all the odd number pages. If the procedure has been completed (S490: YES), control returns to the procedure shown in FIG. 3 at a position where the PROCESS/FONT REGISTRATION PROCEDURE shown in FIG. 5 was called.

With the above procedure, the odd number pages are sequentially printed. Thus, according to the procedures shown in FIGS. 5 and 6, the even number pages are sequentially printed on front surfaces of recording sheets, and then, the odd number pages are sequentially printed on the back surfaces of the sheets. The user could bind the thus printed sheets as a book.

In the above-described example, although the print job is performed such that the even number pages are printed first, and then the odd number pages are printed, the extraction of the font data is performed sequentially from the first page (i.e., S500-S550). This order is determined because of the following reasons.

When the spool file is transmitted with the font data included therein, the format of the font data included in the spool file may depend on specifications of the employed OS. If an EMF corresponding to one page includes all the font data which is used in the page, no problem arises. However, there may be a case where the font data which is used on second page and the later, or is used on a page other than the first page is included only in the first page of the EMF.

By performing the procedure in S500-S550, it is ensured that the font data is extracted sequentially from the first page. If the OS is configured such that the font data for each page is included in the EMF for the page, it is unnecessary to execute the procedure in S500-S550.

In the above-described network printing system, when the application 14 in the client PC 1 creates a print job using font data which is not installed in the server PC 2, the spool file including an EMF having the font data is generated and transmitted to the server PC 2. In the server PC 2, when the spool files are converted into printer control codes by the GDI 25, the font data included in the spool file is extracted. Therefore, desired printing results can be achieved. In the conventional system, if the spool file includes modification information, and the spool file is modified by the spool file modifying module 23, the font data included in the spool file cannot be used for printing. In order to cope with this problem, according to the embodiment, the font data included in the EMFs for respective pages is extracted and registered as a system font so that the desired printing results are achieved.

Thus, with the network printing system according to the embodiment of the invention, even if the spool data including the font data, which is transmitted from the client PC 1, further includes modification information, since the font data is extracted from the spool file and registered as the system font before the spool file is processed, the font data can be used for the spool file even though it is processed, and a desired print result can be realized without fail.

The above-described embodiment is an exemplary embodiment, and various modifications can be realized without departing from the gist of the invention.

For example, in the embodiment, the spool file created by the client PC 1 and stored in the spool area 28 is retrieved by the print processor 27. Then, it is judged whether the modification information is included in the spool file, and if the modification information is included, the spool file is transferred to the spool file modifying module.

The invention is not limited to such a procedure, and the above process may be modified as follows. That is, all the spool files may be transferred to the spool file modifying module 23 regardless whether the modification information is included or not, and the processed by the spool file modifying module 23. In this case, however, the spool files which do not have the modification information are unchanged after processed by the spool file modifying module 23, and are returned to the spooler system 26.

In the above-described embodiment, the network system is configured such that the client PC 1 and the server PC 2 are connected through a wired network. However, the invention is not limited to such a configuration, and the server PC 2 and client PCs 1 may be interconnected through a wireless network.

In the above-described embodiment, as examples of the modification of the spool file, the overlap printing and the manual duplex printing are described. However, the invention is not limited to such exemplary configuration, and various processes such as a multi-page printing can be employed as the modification of the spool file.

In the above-described embodiment, the programs that realize the functions of the spool file modifying device (e.g., the functions of the spool file modifying module 23, the print processor 27 and the like) are stored in the HDD 22. However, the programs may be stored in any other medium such as a flexible disk, magneto-optical disc, CD-ROM, ROM, non-volatile memory and the like which is accessible by a computer. By loading the necessary programs from such a medium into the computer system, the spool file modifying device can be realized on the computer.

In the above-described embodiment, in accordance with operation/instruction at the client PC 1, the spool file is created in the client PC 1, and is transmitted to the server PC 2. However, the invention is not limited to such a configuration. There exists a printing system in which, under control of the client PC 1, the spool file is created in the server PC 2. That is, in accordance with operation/instruction made at the client PC, the server PC 2 may be controlled to generate the spool file. The present invention is applicable to such a system.

The present disclosure relates to the subject matter contained in Japanese Patent Application No. 2001-326411, filed on Oct. 24, 2001, which is expressly incorporated herein by reference in its entirety.

What is claimed is:

1. A spool file modifying device to run on an operating system being installed in a print server connected with a printer and an external terminal, the print server having a receiver system to receive a spool file created in the external terminal and a transmitter system to transmit print data to the printer, the spool file modifying device comprising:
   a modifying information presence judging system to judge as to whether the spool file includes modifying information representing a modification to be made among modification options, the modification options including overlap printing, manual duplex printing, page-exchange printing, in which a plurality of successive pages are incorporated into one page;
   a modifying system that modifies the spool file to create a modified spool file according to modifying information,
   a font data extracting system that extracts font data included in the spool file prior to modification of the spool file by the modification system, when the modification information presence judging system judges that the spool file includes the modifying information;
   a registering system that registers the extracted font data with the printer server prior to the modification of the spool file by the modification system, when the font data extracting system extracts the font data; and
   a converting system to convert the modified spool file into the print data by using the extracted font data when the registering system registers the extracted font data;
   wherein the modifying information presence judging system comprises a part of functions equipped to the operating system, and the modifying system comprises a part of functions equipped to a device driver which is separated from the operating system and functions in association with the operating system; and
   wherein the transmitter system of the printer server transmits the print data converted by the spool file modifying device to the printer.

2. The spool file modifying device according to claim 1, further including a registration deleting system that deletes the extracted font from the registration when the print server has completed transmission of the print data to the printer.

3. The spool file modifying device according to claim 2, further including a memory in which the extracted font data is stored, said registration deleting system deleting the extracted font data stored in said memory when the print server has completed transmission of the print data to the printer.

4. The spool file modifying device according to claim 3, wherein said memory is a volatile memory.

5. The spool file modifying device according to claim 1, further comprising a font data detecting system that examines the spool file to detect whether font data is included in the spool file,
   wherein said font data extracting system and said registering system operate when said font data detecting system detects that font data is included in the spool file.

6. The spool file modifying device according to claim 1, further comprising a storage that stores the spool file, wherein said modifying system replaces the spool file stored in said storage with the modified spool file.

7. The spool file modifying device according to claim 1, wherein said print server and the external device are interconnected through a network system.

8. The spool file modifying device according to claim 1, wherein the spool file is created in the external terminal and transmitted to the print server.

9. A spool file modifying device to run on an operating system being installed in a print server connected with a printer and at least one external terminal, the print server having a receiver system to receive a spool file created in the at least one external terminal and a transmitter system to transmit print data to the printer, the spool file modifying device comprising:
   a spool file storage that stores the spool file;
   a retrieving system that retrieves the spool file stored in the spool file storage;
   a modifying information presence judging system to judge as to whether the spool file retrieved by the retrieving system including modifying information representing a modification to be made among modification options, the modification options including overlap printing, manual duplex printing, page-exchange printing, in which a plurality of successive pages are incorporated into one page;
   a font data detecting system that examines the spool file retrieved by the retrieving system to detect whether font data is included in the spool file;
   a modifying system that modifies the spool file according to the modifying information and replaces the spool file with the modified spool file;
   a font data extracting system that extracts font data included in the spool file prior to modification of the spool file by the modification system, when the font data detecting system judges that the spool file includes the font data;
   a registering system that registers the extracted font data with the print server prior to the modification of the spool file by the modification system, when the font data extracting system extracts the font data; and
   a converting system to convert the modified spool file into the print data by using the extracted font data registered when the registering system registers the extracted font data;
   wherein the modifying information presence judging system bears a part of functions equipped to the operating system, and the modifying system bears a part of functions equipped to a device driver which is separated from the operating system and functions in association with the operating system; and wherein the transmitter system of the printer server transmits the print data converted by the spool file modifying device to the printer.

10. The spool file modifying device according to claim 9, further including a registration deleting system that delete the extracted font data from the registration when the print server has completed transmission of the print data to the printer.

11. The spool file modifying device according to claim 10, further including a volatile memory,
wherein said registering system stores the extracted font data in said volatile memory as a system font of the print server.

12. The spool file modifying device according to claim 9, further includes a dividing system that divides the spool file stored in the spool file storage into intermediate files for respective pages, said font data detecting system examining each of the intermediate files divided by said dividing system to detect whether font data is included therein, said font data extracting system extracting the font data from each of the intermediate files when detected to include the font data.

13. The spool file modifying device according to claim 12, wherein said font data detecting system examining the intermediate files sequentially from a first page to the end.

14. The spool file modifying device according to claim 9, wherein said print server and the external device are interconnected through a network system.

15. The spool file modifying device according to claim 9, wherein the spool file is created in the external terminal and transmitted to the print server.

16. A method of modifying a spool file in a print server connected to a printer and at least one external terminal, the print server having a receiver system to receive a spool file created in the at least one external terminal and a transmitter system to transmit print data to the printer, the method comprising:

examining the spool file to detect whether font data is included in the spool file and whether the spool file includes modifying information representing a modification to be made among modification options, the modification options including overlap printing, manual duplex printing, page-exchange printing, in which a plurality of successive pages are incorporated into one page;

modifying the spool file in the print server to create a modified spool file according to modifying information;

extracting the font data included in the spool file prior to modification of the spool file by the modification system, when the spool file is judged to include the modifying information;

registering the extracted font data with the printer server prior to the modification of the spool file by the modification system, when the font data extracting system extracts the font data; and converting the modified spool file into the print data using the extracted font data when the registering system registers the extracted font data; and transmitting the print data to the printer, which was converted from the modified spool file.

17. The method according to claim 16, further including deleting the extracted font from the registration upon completion of transmission of the print data to the printer.

18. The method according to claim 16, further including dividing the spool file into intermediate files for respective pages,
wherein the examining the spool file examines each of the intermediate files as divided to detect whether font data is included therein, and
wherein the extracting the font data extracts the font data from each of the intermediate files when it is detected to include the font data.

19. The method according to claim 18, wherein the examining the spool file examines the intermediate files sequentially from a first page to the end.

20. The method according to claim 16, wherein said print server and the external device are interconnected through a network system.

21. The method according to claim 16, wherein the spool file is created in the external terminal and transmitted to the print server.

22. A computer-accessible memory medium, the memory medium containing a program to be executed by a computer to realize a spool file modifying device for a print server connected with a printer and an external terminal, the print server creating a modified spool file as instructed by the external terminal, the print server having a receiver system to receive a spool file created in the at least one external terminal and a transmitter system to transmit print data to the printer, wherein the program contained in the memory medium includes a method that includes:

examining the spool file to detect whether font data is included in the spool file and whether the spool file includes modifying information representing a modification to be made among modification options, the modification options including overlap printing, manual duplex printing, page-exchange printing, in which a plurality of successive pages are incorporated into one page;

modifying the spool file in the print server to create a modified spool file according to modifying information, extracting the font data included in the spool file prior to modification of the spool file by the modification system, when the spool file is judged to include the modifying information:

registering the extracted font data with the printer server prior to the modification of the spool file, when the font data is extracted; and converting the modified spool file into the print data using the extracted font data when the extracted font data is registered; and transmitting the print data to the printer, which was converted from the modified spool file.

* * * * *